(12) United States Patent
Chino et al.

(10) Patent No.: US 6,496,658 B2
(45) Date of Patent: Dec. 17, 2002

(54) IMAGE OUTPUT APPARATUS AND CAMERA

(75) Inventors: Naoyoshi Chino, Kanagawa (JP); Yasunori Tanaka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/858,722

(22) Filed: May 17, 2001

(65) Prior Publication Data

US 2001/0043811 A1 Nov. 22, 2001

(30) Foreign Application Priority Data

May 17, 2000 (JP) ........................................ 2000-145060

(51) Int. Cl.[7] ............................. G03B 29/00; H04N 1/04
(52) U.S. Cl. ........................... 396/429; 348/96; 358/487
(58) Field of Search ............................. 396/429; 348/96, 348/110, 111; 358/506, 487

(56) References Cited

U.S. PATENT DOCUMENTS 5,678,102 A * 10/1997 Chamberlain, IV ......... 396/429

FOREIGN PATENT DOCUMENTS

| JP | 5-75922 | 3/1993 | .......... H04N/5/253 |
| JP | 10-301198 | 11/1998 | ........... G03B/17/48 |

\* cited by examiner

*Primary Examiner*—W. B. Perkey
(74) *Attorney, Agent, or Firm*—Sughrue Mion, PLLC

(57) ABSTRACT

An image output apparatus and a camera each include a light source for illuminating an image recorded on a developed film drawn out from a loaded cartridge containing the developed film, an image reading device for reading information of the image through photoelectric conversion, and an image information output device for displaying the information of the image on an image display device. The image reading device is a two-dimensional photoelectric conversion device, which has a size approximately equal to or larger than a size of an image area on the developed film, is disposed in the proximity of the developed film, and receives light beams carrying the information of the image that have passed through the developed film or have passed through the developed film and imaged through an imaging lens system.

20 Claims, 12 Drawing Sheets

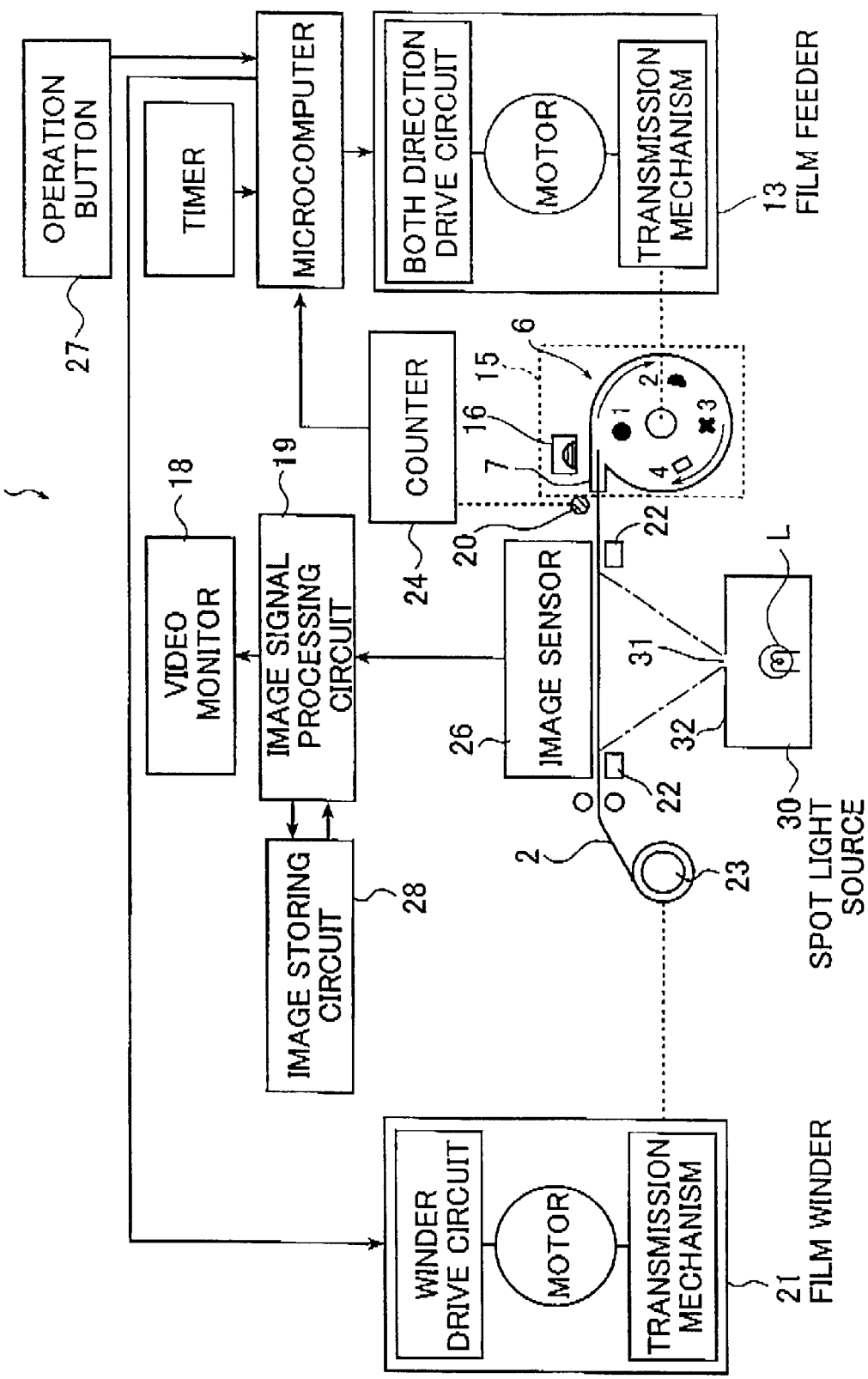

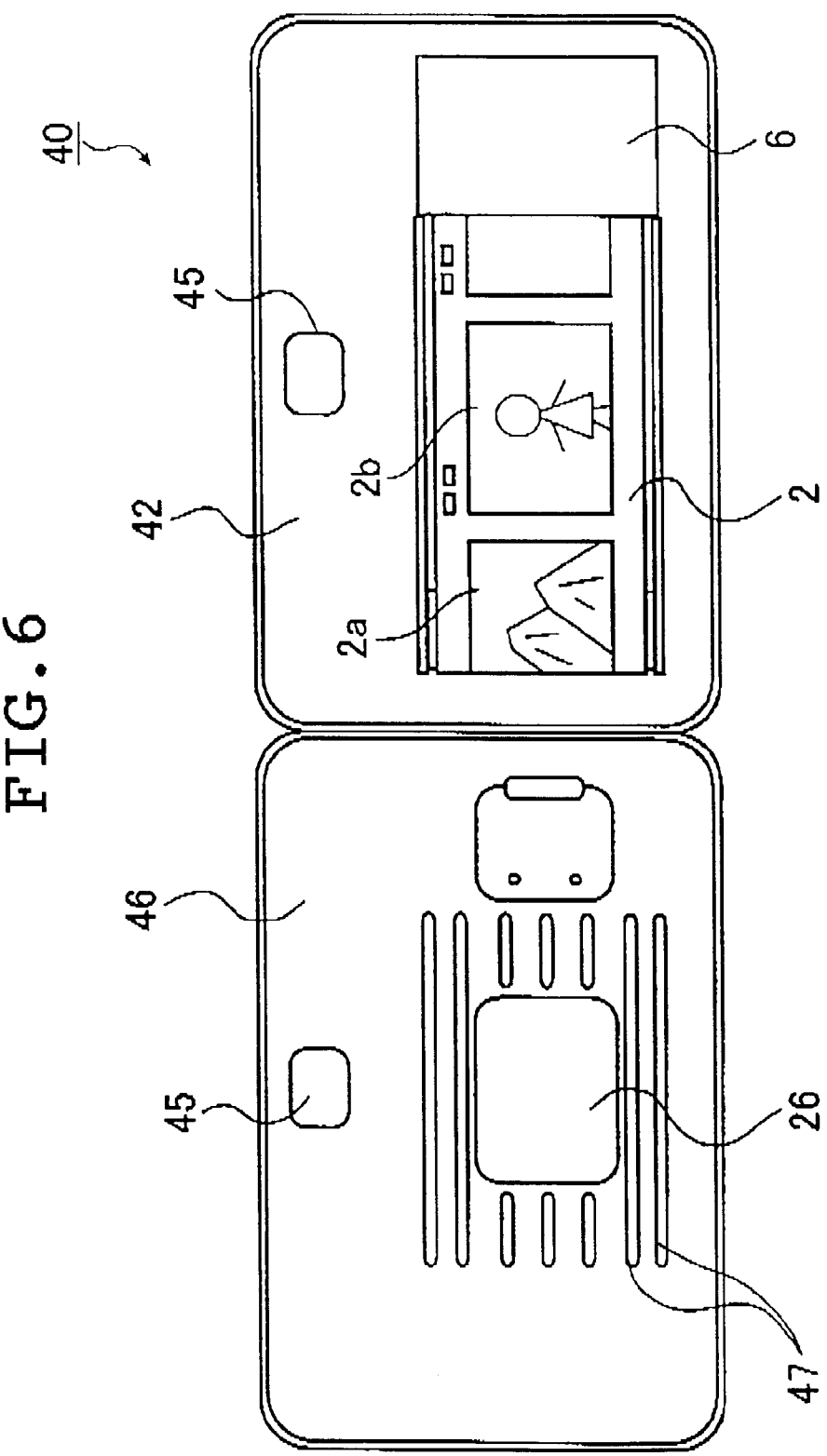

IMAGE OUTPUT APPARATUS AND CAMERA

BACKGROUND OF THE INVENTION

The present invention relates to an image output apparatus and a camera, and more particularly, to an image output apparatus having an image output function capable of displaying the image information of a developed photographic film and to a composite function type camera having this image output function built therein.

In recent Advanced Photo Systems (APS) having a new standard and using a silver halide film provided with a magnetic recording area, when a photographer takes a picture using a film of this new standard and requests a photo-labo to develop the film after it is exposed, the film having been developed is returned to the photographer in a state it is accommodated in a cartridge together with a print called an index print from which the photographer can get a glimpse of all the images recorded on the film. Thus, if the photographer loses the index print, he or she cannot confirm the photographing contents of the developed film.

The apparatus proposed by the applicant in Japanese Unexamined Patent Application Publication No. 5-75922 (Japanese Patent Application No. 3-190127 titled "Film Image Input Apparatus") can be exemplified as a technology for avoiding this drawback, the apparatus being capable of being loaded with a film cartridge as it is and reproducing the images recorded on the film accommodated in the film cartridge on a video monitor. That is, this apparatus is loaded with the cartridge in which a developed film is accommodated and reproduces the images recorded on the film drawn out from the cartridge on the video monitor.

This apparatus is dedicated for the reproduction of the images recorded on a film accommodated in a film cartridge on the video monitor as is apparent from its name. Further, the image reproducing mechanism of the apparatus is such that the images recorded on the film drawn out from the film cartridge loaded thereon are projected onto and formed on an image reading unit such as a CCD or the like using a lens system, and a result of photoelectric conversion of the images executed by the image reading unit is outputted to the video monitor as an image signal.

Further, the applicant proposed a camera having a photographed image reading unit built in the camera in Japanese Unexamined Patent Application Publication No. 10-301198 (Japanese Patent Application No. 9-111404 titled "Camera"). The camera can easily confirm the photographing contents of a developed film, independently from the above film image input apparatus. The camera includes, in addition to an ordinary photographing function, a photographed image reading unit for reading, when a loaded film is a developed film, the image information recorded on the developed film through photoelectric conversion and an image display unit for displaying images based on a signal outputted from the photographed image reading unit.

The camera according to the above application is additionally provided with a function for determining four states of a loaded film from the displays on a film cartridge, that is, a state in which the film is not yet used, a state in which the film is being used, a state in which the film has been used for photographing (not yet developed), and a state in which the film has been developed, in addition to that the camera effectively utilizes a film transportation mechanism which is intrinsically provided therewith such as a function for feeding the film, a function for winding the film and further a function for feeding the film frame by frame. Further, the camera is additionally provided with the above photoelectrially reading unit for reading a developed film, the above display unit for displaying the information of the read film, and a control function for automatically operating these units.

That is, when the camera according to this application is loaded with the above-mentioned film of the new standard, the camera determines a state of the film by the above determining function: when the film is not yet used, the camera functions as an ordinary camera, whereas, when the camera determines that the film has been developed, it can function as an image output apparatus instead of functioning as a camera. Thus, it is possible for the camera to output the images recorded on the developed film to the image display unit by the function of the camera as the image output apparatus. Note that when the film is being used or when images have been recorded on the film, the camera finishes processing.

The camera according to the above application also has a function as an image display apparatus (an image output apparatus) in addition to its intrinsic function as a camera, which can provide a novel, effective method of use of the camera such as a method of confirming the contents of a film cartridge even if only the film cartridge is available, a method of showing the contents of the film accommodated in the film cartridge to other persons, and the like, in addition to its use for coping with the above-mentioned case in which the index print is lost.

The former of the above conventional arts, that is, the film image input apparatus proposed in Japanese Unexamined Patent Application Publication No. 5-75922 is an apparatus dedicated for reproducing images recorded on a film accommodated in a film cartridge onthe videmonitor. However, it is difficult to conceive that ordinary consumers purchase the apparatus which is by no means less expensive only for a purpose of viewing images recorded on a film. Further, since the film image input apparatus projects and forms images recorded on a film on the image reading unit such as the CCD or the like using the lens system, the apparatus has a problem in that an increase in size of the apparatus cannot help being avoided because a certain degree of distance must be secured from a film to the image reading unit such as the CCD or the like, in addition to a problem that the lens system is indispensable. This problem is a large bottleneck when, for example, it is intended to manufacture the film image input apparatus at a low cost so that it comes into widespread use in ordinary users.

In contrast, the latter of the above conventional arts, that is, the camera proposed in Japanese Unexamined Patent Application Publication No. 10-301198 does not have the problem mentioned above because it directly reads images recorded on a film using a line CCD or an area CCD. However, when an ordinary camera is caused to function as an image output apparatus, there is another problem that a quantity of light which is necessary for illumination is insufficient to read the images recorded on a film.

SUMMARY OF THE INVENTION

Accordingly, it is a first object of the present invention, which was made in view of the circumstances of the above conventional arts, to provide an image output apparatus which is less expensive, the size of which can be easily reduced and which has a more practically usable image output function by further improving the above-mentioned image output apparatus and camera.

Further, second and third objects of the present invention are to provide a composite function type camera having the above-mentioned image output function built therein.

More specifically, the first object of the present invention is to provide an image output apparatus which does not need a lens system, the size of which can be reduced to a possible minimum size by setting a very short distance from a film to an image reading unit such as a CCD or the like, and which can effectively read images and is more practically usable.

Further, the second object of the present invention is to provide a composite function type camera having the above-mentioned image output function built therein.

Furthermore, the third object of the present invention is to provide a composite function type camera which can effectively read images by assembling a light source therein and includes an image output function having a higher degree of a practical use and built therein.

The inventors have completed this invention by examining to further improve the camera proposed in Japanese Unexamined Patent Application Publication No. 10-301198 and by diligently performing studies to achieve the first, second, and third objects.

In order to attain the first object described above, the first aspect of the present invention provides an image output apparatus, comprising: a film transportation device for drawing out a developed film from a loaded cartridge containing the developed film, for stopping the developed film at a predetermined position, and thereafter for rewinding the developed film into the cartridge; a light source for illuminating an image recorded on the developed film; an image reading device disposed in a proximity of a transportation path of the developed film for reading information of the image recorded on the developed film through photoelectric conversion; and an image information output device for displaying the information of the image on an image display device, wherein the image reading device is a two-dimensional photoelectric conversion device having a size approximately equal to or larger than a size of an image area on the developed film, and light beams emitted from the light source pass through the developed film, are directly received by the image reading device, photoelectrically converted by the image reading device, and outputted to the image information output device as the information of the image.

Preferably, the light source is a parallel light source disposed on an opposite side of the image reading device with respect to the developed film.

Preferably, the light source is a spot light source disposed on an opposite side of the image reading device with respect to the developed film.

Preferably, the spot light source comprises a nonspot-shaped light source and a pinhole.

It is preferable that the image output apparatus further comprises a low-pass filter interposed between the light source and the image reading device.

Preferably, the image display device is any one of a home TV monitor, a CRT monitor, and a liquid crystal monitor.

In order to attain the second object described above, the second aspect of the present invention provides a camera, comprising: a film transportation device for drawing out an unexposed film or a developed film from a loaded cartridge containing the unexposed film or the developed film, for stopping the unexposed film or the developed film at a predetermined position, and thereafter for rewinding the unexposed film or the developed film into the cartridge; an image exposing device for recording images on the unexposed film being drawn out or being rewound frame by frame; a light source for illuminating an image recorded on the developed film; an image reading device disposed in a proximity of a transportation path of the developed film for reading information of the image recorded on the developed film through photoelectric conversion; and an image information output device for displaying the information of the image on an image display device, wherein the image reading device is a two-dimensional photoelectric conversion device having a size approximately equal to or larger than a size of an image area on the developed film, and light beams emitted from the light source pass through the developed film, are directly received by the image reading device, photoelectrically converted by the image reading device, and outputted to the image information output device as the information of the image.

Preferably, the light source is a parallel light source disposed on an opposite side of the image reading device with respect to the developed film.

Preferably, the light source is a spot light source disposed on an opposite side of the image reading device with respect to the developed film.

Preferably, the spot light source comprises a non-spot-shaped light source and a pinhole.

Preferably, the spot light source introduces light beams from an outside of the camera through a minute light transmission device.

It is preferable that the camera further comprises a low-pass filter interposed between the light source and the image reading device.

Preferably, the image display device is any one of a home TV monitor, a CRT monitor, and a liquid crystal monitor.

In order to attain the third object described above, the third aspect of the present invention provides a camera, comprising: a film transportation device for drawing out an unexposed film or a developed film from a loaded cartridge containing the unexposed film or the developed film, for stopping the unexposed film or the developed film at a predetermined position, and thereafter for rewinding the unexposed film or the developed film into the cartridge; an image exposing device for recording images on the unexposed film being drawn out or being rewound frame by frame, a light source for illuminating an image recorded on the developed film; an image reading device disposed in a proximity of a transportation path of the developed film for reading information of the image recorded on the developed film through photoelectric conversion; and an image information output device for displaying the information of the image on an image display device, wherein the image reading device is a two-dimensional photoelectric conversion device, and light beams emitted from the light source pass through the developed film and an imaging lens system, are received by the image reading device, photoelectrically converted by the image reading device, and outputted to the image information output device as the information of the image.

Preferably, the light source is a parallel light source disposed on an opposite side of the image reading device with respect to the developed film.

Preferably, the light source is a spot light source disposed on an opposite side of the image reading device with respect to the developed film.

Preferably, the spot light source comprises a non-spot-shaped light source and a pinhole.

Preferably, the spot light source introduces light beams from an outside of the camera through a minute light transmission device.

It is preferably that the camera further comprises a low-pass filter interposed between the light source and the image reading device.

Preferably, the image display device is any one of a home TV monitor, a CRT monitor, and a liquid crystal monitor.

BRIEF DESCRIPTION OF THE DRAWINGS

FIG. 4 is a block diagram schematically showing another example of the internal arrangement of the image output apparatus according to the present invention;

FIG. 6 is a view schematically showing an embodiment of the internal arrangement of the camera shown in FIG. 5 in a state in which the back lid of the camera is opened;

DETAILED DESCRIPTION OF THE INVENTION

An image output apparatus and a camera according to the present invention will be described below in detail with reference to the preferable examples shown in the accompanying drawings.

Figure 1:
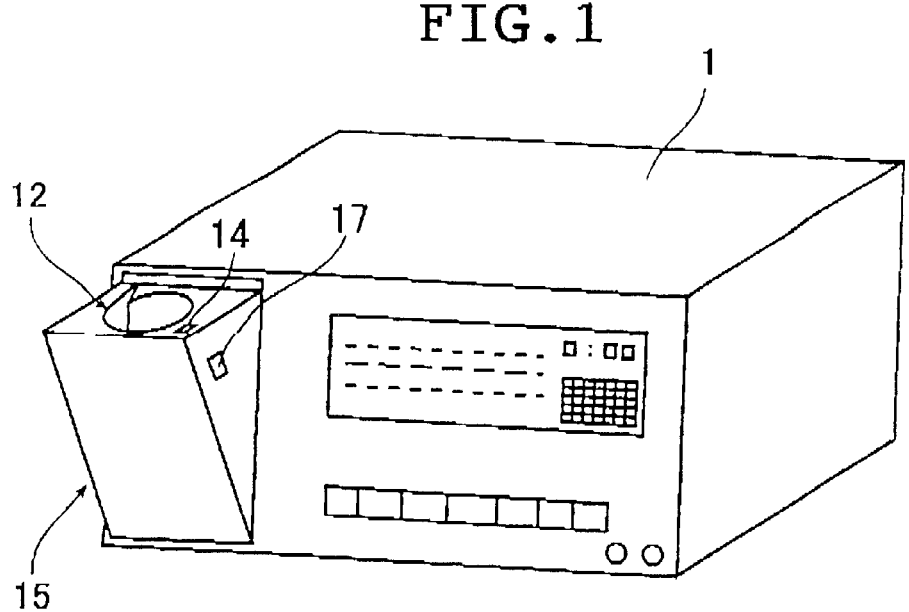
FIG. 1 is an outside view of an example of an image output apparatus according to the present invention.
Figure 2:
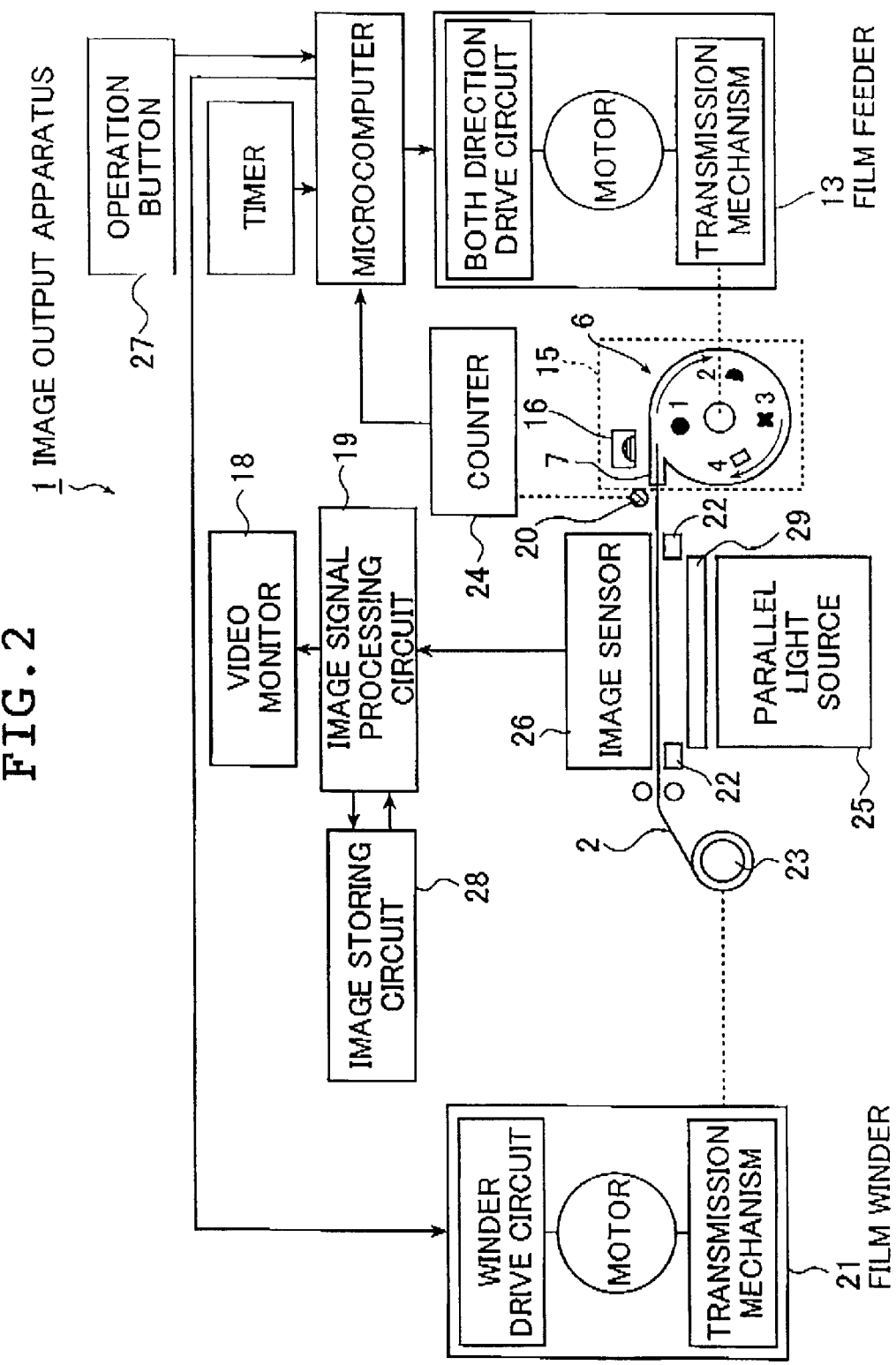
FIG. 2 is a block diagram schematically showing an example of the internal arrangement of the image output apparatus shown in FIG. 1.

FIG. 1 is an outside view of an image output apparatus 1 according to a first example of a first embodiment of the present invention, and FIG. 2 is a block diagram schematically showing an example of the internal arrangement of the image output apparatus 1.

In FIG. 1, reference numeral 12 denotes a cartridge accommodation opening for accommodating a film cartridge. The cartridge accommodation port 12 has a shape formed substantially similar to that of a film cartridge 6 as a subject to be accommodated (here, the above-mentioned APS film cartridge of the new standard), which prevents a different type of a film cartridge from being erroneously loaded.

Further, reference numeral 14 denotes a loading completion detector for detecting that the film cartridge 6 has been loaded by being inserted into the cartridge accommodation port 12 and by closing the cartridge accommodation port 12, reference numeral 15 denotes a cartridge accommodation unit, and reference numeral 17 denotes a lock unit for locking the cartridge accommodation unit 15 to prevent it from being erroneously opened.

The cartridge accomodation unit 15 is provided with an optical mark reading unit 16 as shown in FIG. 2 to identify a type of a film 2 as well as to identify that the film 2 accommodated in the cartridge accomodation unit 15 has been developed. As will be described later, an image signal processing circuit 19 is switched to a video monitor in accordance with a type of the film 2 identified by the optical mark reading unit 16.

In FIG. 2, reference numeral 1 denotes the above image output apparatus, reference numeral 6 denotes the above film cartridge 6, reference numeral 7 denotes the film drawing port of the film cartridge 6, reference numeral 2 denotes the above film which is drawn out from the film cartridge 6 through the film drawing port 7, and reference numeral 22 denotes an opening frame which acts as a means for temporarily stopping the film 2 sent from the film cartridge 6 by a film feeder 13 at a prescribed position and forming an image frame. The opening frame 22 operates to press and hold the film 2, and then to release the film 2 (forward and backward) in synchronism with the operations of the film feeder 13 and a film winder 21.

That is, the opening frame 22 is positioned so as to cause the film 2 to come into contact with an image sensor 26, which will be described later, only when both the above-mentioned film feeder 13 and film winder 21 stop the operations. Otherwise, the opening frame 22 is held in an open state keeping an interval which does not interfere with passing of the film 2. This arrangement is made in consideration of improving the quality of an image by minimizing the distance between the film 2 and the image sensor 26 when the film 2 is read as well as preventing the film 2 from being damaged by abrasion marks and the like when it is moved.

Further, in FIG. 2, reference numeral 25 denotes a parallel light source for emitting parallel light beams. The parallel light source 25 may be composed of a combination of a multiplicity of light-emitting elements and collimator lenses as many as the light-emitting elements, a combination of a plane-shaped light source and a micro lattice or a micro porous plate, or the like. However, the present invention is by no means limited thereto, and an arrangement for introducing parallel light beams emitted from the outside may be employed.

Figure 3A:
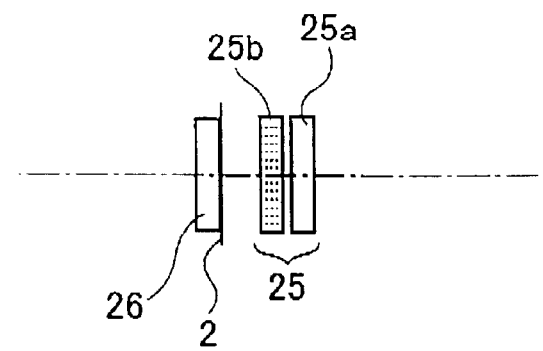
FIG. 3A is a view explaining the detailed arrangement of an example of a parallel light source.
Figure 3B:
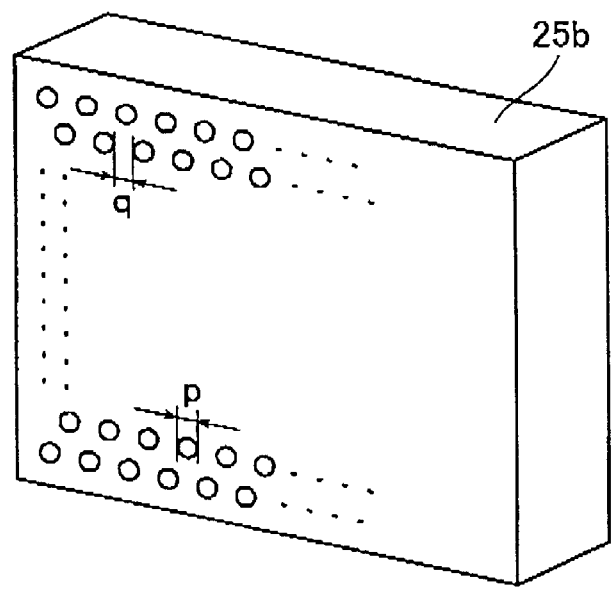
FIG. 3B is a perspective view showing an example of a micro porous plate.
Figure 3C:
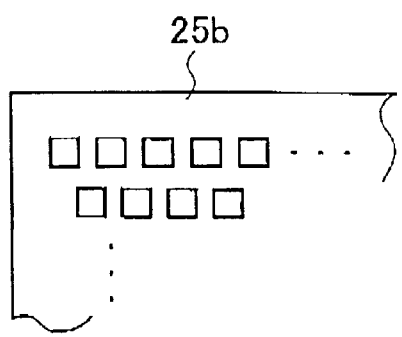
FIGS. 3C and 3D are views explaining other examples of the arrangement of the micro porous plate.
Figure 3D:
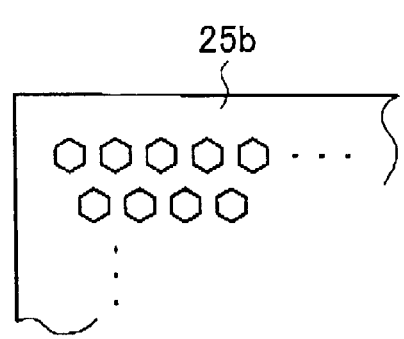

FIGS. 3A to 3D show examples of the arrangement of the above-mentioned micro lattice or micro porous plate. FIG. 3A is a view showing the overall arrangement of the parallel light source 25, wherein reference numeral 25a denotes the plane-shaped light source, and reference numeral 25b denotes the micro porous plate 25b. Further, FIG. 3B is a view showing an example of a specific arrangement of the micro porous plate 25b, and FIGS. 3C and 3D are views showing other examples of the special arrangement of the micro porous plate 25b.

Note that, in FIG. 3B, reference symbol p denotes the size of each pore of the micro porous plate 25b (a diameter when each pore is a circle), and reference symbol q denotes the thickness of a wall between pores. The value of p is preferably set to, for example, 0.2 mm to 1.5 mm and more preferably to 0.3 mm to 1.0 mm, and the value of q is preferably set to, for example, about 0.1 mm to 0.5 mm.

In FIG. 2, reference numeral 29 denotes a low-pass filter inserted to improve the definition of a read image.

Further, reference numeral 23 denotes a spool on the side where the film 2 is wound, reference numeral 20 denotes a film presence sensor for optically sensing whether a film is present or absent, reference numeral 19 denotes the image signal processing circuit 19, and reference numeral 18 denotes the videomonitor such as a CRT or the like. Note that these various types of the components will be described later in detail in the explanation of the operation of the image output apparatus.

The operation of the image output apparatus according to this example will be schematically described below.

When the film cartridge 6 has been loaded in such a manner that the developed film 2 is inserted into the cartridge accomodation unit 15 from the cartridge accommodation port 12 and the cartridge accommodation port 12 is closed, the lock unit 17 locks the cartridge accommodation port 12 to prevent it from being erroneously opened. Subsequently, the optical mark reading unit 16 identifies a type of the loaded film 2 and the above-mentioned state and switches the image signal processing circuit 19 in accordance with the type of the film 2.

Note that when a mark indicating that the film 2 has been developed is not displayed on the cartridge or a mark other than the mark indicating that the film has been developed is displayed thereon in the identifying operation of the optical mark reading unit 16, the image output apparatus 1 displays a warning indicating it and is put into a waiting state. Further, the image output apparatus 1 may permit the film cartridge 6 to be taken out by unlocking and automatically opening the cartridge accommodation port 12 together with the display of the warning.

Further, the processing for switching the image signal processing circuit 19 based on a type of the film 2 is to switch a circuit to be used in order to display, when the film 2 is a negative film, images recorded thereon as positive images by reversing the recorded images, whereas in order to display, when the film 2 is a positive film, the recorded images as positive images as they are without reversing them.

The following description will be continued on the assumption that the film 2 is a negative film and that images recorded on the film 2 are displayed on the image display device 1 after they are read and reversed.

When the film cartridge 6 is loaded as described above in a state in which the image output apparatus 1 is put into operation, that is, the respective components of the apparatus 1 are started and the parallel light source 25 is emitted, the film 2 (hereinafter, refer red to as a "negative film" 2) drawn out from the loaded film cartridge 6 is transported by a predetermined distance by the film feeder 13 and the film winder 21, and the image frame of a first frame is positioned at a reading position.

When the image frame on the negative film 2 has been stopped at a predetermined position, the negative film 2 is held by being pressed in the direction of the image sensor 26 by the opening frame 22. Note that when the negative film 2 is a new standard film, it can be easily positioned by sensing a perforation that accurately corresponds to the position of the image frame.

The image frame of the negative film 2 positioned at the reading position is illuminated with parallel light beams emitted from the parallel light source 25, and light beams having passed therethrough, that is, light beams carrying the image information on the image frame are incident on the image sensor 26. Information, which has been subjected to photoelectric conversion in correspondence to the respective positions on the image frame, is read by the image sensor 26 in a predetermined order and sent to the image signal processing circuit 19.

The image signal processing circuit 19 corrects an image signal corresponding to a negative image inputted thereto by subjecting the image signal to predetermined gradation conversion, image density adjustment, white balance adjustment, and the like and then displays the negative image on the video monitor 18 as a positive image. The opening frame 22 is put into an open state after a predetermined period of time passes or in response to a command issued by an operator of the apparatus through an operation button 27 (refer to FIG. 2), and subsequently the film feeder 13 resumes rotation. Then, the next image frame is positioned at the reading position by detecting the perforation of the frame and stopping the negative film 2, similarly to the above case.

Note that it is preferable to continuously display the image of the previously displayed image frame during the above-mentioned film moving period of time. In this case, the data of the display image, which was created previously in the image signal processing circuit 19, can be stored in the image recording circuit 28 and used to display the image.

With this operation, a scene (image) can be smoothly changed without applying any visually unpleasant feeling to the operator of the apparatus.

The image sensor 26 used in the above example will be described below.

As described above, the image sensor 26 of the image output apparatus 1 according to this example is composed of an area CCD having a size at least approximately as large as an image area on the negative film 2 (17 mm×30 mm in the above-mentioned APS film). Further, it is sufficient for the image sensor 26 to have the number of pixels which is necessary to display an image which can be visually recognized on the video monitor 18. Thus, the number of the pixels is, for example, 300,000 pixels to 1,500,000 pixels and preferably about 500,000 pixels to 1,000,000 pixels.

The area per pixel of the above area CCD can be increased because the number of the pixels of the CCD is not so large and the overall size thereof is considerably large. With this arrangement, since the quantity of light beams received by the image sensor 26 is increased, the image sensor 26 has an advantage that it can easily obtain a bright and distinct image even with weak light beams.

It should be noted that what is required to the image sensor 26 used in the image output apparatus 1 according to this example is to make as thin as possible the thickness of the overall CCD including a protective layer (glass layer) formed on the respective elements constituting the area CCD, while the number of the pixels of the area CCD need not be so large as described above. That is, in the image output apparatus 1 according to this embodiment, since an image on the negative film 2 is directly projected onto the image sensor 26 using approximately parallel light beams as described above, it is preferable to make the distance therebetween as short as possible.

It is possible to display an image which can endure practical observation by setting the overall thickness of the image sensor 26, which is a total of the thickness of a CCD main body, the thickness of the protective layer (glass layer) and the distance of the space therebetween, to, for example, 2 mm or less and preferably to 1 mm or less. It is preferable to set the thickness of the protective layer (glass layer) to 0.5 mm or less.

Further, while it is preferable that the image sensor 26 have higher sensitivity in order to make it possible to use a less bright light source as the parallel light source 25, the sensitivity of the image sensor 26 does not pose any large problem because a wide range of sensitivity can be employed by changing the charge accumulation time of the CCD.

According to the above example, there can be obtained an advantage that the overall size of the image output apparatus 1 can be reduced because no lens system is necessary to read an image on a film and the distance between the film and the image reading unit can be reduced.

Note that while a case in which a home video monitor such as a CRT monitor is used as the image display device is exemplified in the above example, it is also possible to use other device such as a liquid crystal monitor and the like as the image display device. Further, the image display device may be built in the image output apparatus or may be mounted on the outside thereof.

Next, an image output apparatus of a second example of the first embodiment of the present invention will be described.

The second example has such a feature that it employs a spot light source 30 as a light source for illuminating the negative film 2, different from the first example described above.

Specifically, a shading plate 32 having a pinhole 31 is interposed between a light source lamp L and the negative film 2, and an image on the negative film 2 is projected onto the image sensor 26 (CCD) making use of light beams incident through the pinhole 31.

The size of the pinhole 31 (diameter of a circular hole) is set to, for example, 0.3 mm to 2 mm, and more preferably to about 0.5 mm to 5 mm. The pinhole light source also permits an image, which can endure practical observation, to be displayed on the video monitor 18 when the distance between the negative film 2 and the image sensor (CCD) 26 is sufficiently reduced.

The image output apparatus according to the second example has an advantage that the light source can be simply arranged as compared with the first example shown previously.

According to the second example, there can be obtained an advantage that the overall size of the image output apparatus can be reduced because no lens system is necessary to read an image on a film and the distance between the film and an image reading unit can be considerably reduced.

Various types of image display devices can be used also in the second example as described above.

Next, an example of a camera according to a second embodiment of the present invention will be described.

This example, which will be described below, is a camera having an image reading unit build therein and capable of easily confirming the photographing contents of a developed film and is a composite function type camera in which the image output function of the image processing apparatus of the first embodiment of the present invention is assembled.

The camera according to this example is arranged such that an image reading system as described above, that is, a CCD (image sensor) is disposed in the proximity of a film as well as a light source for illuminating the film is disposed compactly. As a result, a multi-function camera can be realized which is provided with both of a photographing function and an image output function without almost increasing its size regardless of that the new function is added thereto.

Figure 5:
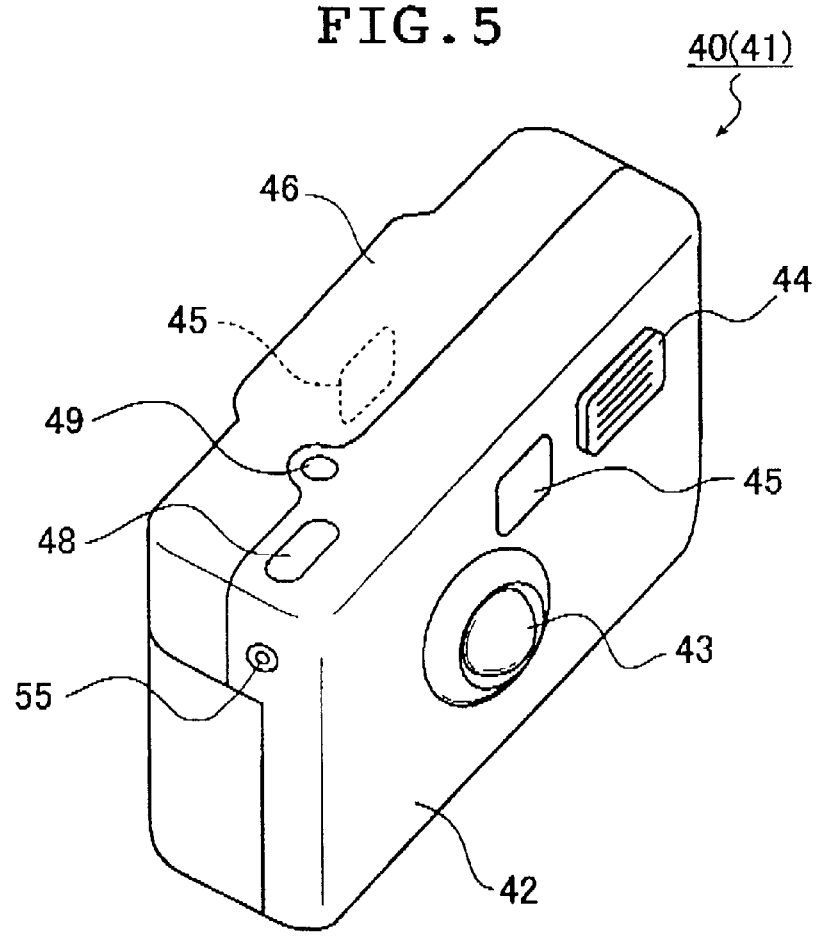
FIG. 5 is an outside perspective view of an example of a camera according to the present invention.

FIG. 5 shows an outside perspective view of the camera according to this example. In FIG. 5, a photographing lens 43 is mounted on the front surface of the main body 42 of the camera 40 at approximately the center thereof. Further, an electronic flash window 44 is disposed on the upper right side of the photographing lens 43, and a finder subject window 45 is disposed on the left side of the electronic flash window 44. A shutter button 48 and a number display window 49 are disposed on the upper surface of the main body 42.

Further, while not shown, an operation panel having a plurality of switches and the like and a zoom lever for adjusting a wide angle shot state and a telephoto shot state are disposed on the back surface of the main body 42. This operation panel includes, for example, keys for designating a date, a key for designating the number of prints, and the like. Various kinds of information designated through these keys are printed on a the new standard film as well as recorded in a magnetic recording region, which is a feature of the new standard film, at the same time.

FIG. 6 schematically shows the internal structure of the camera according to this example in a state in which a back lid 46 is opened. As shown in FIG. 6, the image sensor (CCD area detector) 26 acting as an image reading unit is disposed in the interior of the main body 42 of the camera 40. The image sensor 26 is used to read photographed images (2a, 2b, . . . ) of the developed film 2 which has been drawn out from a film cartridge 6 loaded on the main body 42 of the camera 40 according to this example.

The image sensor 26 is disposed in the proximity of the surface of the film 2 so as to directly read an image area on the film 2 to be fed. The film 2 must be illuminated from a side opposite to the image sensor 26 to stably read an image area on the film 2 without being affected by the brightness around the image area. For this purpose, in this example, a light emitting source is separately disposed in the ma-n body 42 as will be described later.

That is, the parallel light source 25 shown in FIG. 2 or the spot light source 30 shown in FIGS. 4 are exemplified as the light source preferably disposed in the main body 42. When these light sources are used, it is preferable to suitably move them, for example, in parallel with a film feed direction when the photographing function is used to prevent them from interfering with the photographing function.

Further, an arrangement for introducing light beams from a light source disposed externally of the camera 40 to a predetermined position in the camera 40 through an optical fiber also may be employed as the spot light source. In this case, it is preferable to dispose, for example, a light socket having a shape similar to the output terminal 55 of the camera 40 shown in FIG. 5 on the outside of the camera 40 and further to dispose a light guide path composed of an optical fiber from the optical socket to the above predetermined position so that the light beams are introduced from the light source disposed on, for example, an upper portion of the camera 40 into the camera 40. It is preferable that the optical fiber have a diameter of 0.5 mm to 1.0 mm and an aperture ratio of at least 60°. Note that the output of the image sensor 26 is connected to an image signal processing circuit 19 which is similar to those shown in FIGS. 2 and 4, and processed thereby as described above. Then, the thus processed output from the image signal processing circuit 19 is connected to an external video monitor through an output terminal 55 disposed on a side of the main body 42 and displayed on the video monitor as an image.

Note that the camera 40 shown in FIGS. 5 and 6 according to this example includes the various components of the image output apparatus 1 shown in FIG. 2 or 4 and the image output function of the image output apparatus 1. However, such components as a cartridge accomodation unit 15, a film feeder 13, a film winder 21, a spool 23 on a side where the film 2 is wound, and the like, which are provided in the camera 40 intrinsically for photographing, may be used to output an image. while the leading components of the various components of the image output apparatus 1, which are shown in FIG. 2 or 4 and used in the camera 40, will be described here, description of the components other than the leading components is omitted.

Figure 7:
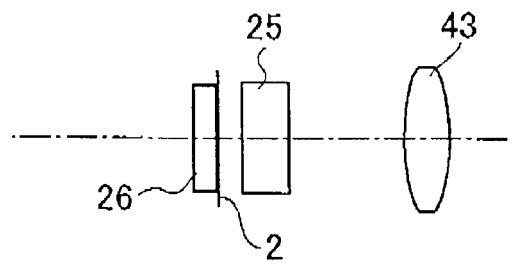
FIG. 7 is a view explaining a positional relationship among a lens, a film, and an image sensor when an image is read with the camera according to the present invention.

FIG. 7 is a view showing a positional relationship among the image sensor 26, the film 2, the parallel light source 25, and the photographing lens 43 when an image recorded on the film 2 is read in the above example. As is apparent also from FIG. 7, the photographing lens 43 is not used at all in this case, and it is preferable that the parallel light source 25, the film 2 and the image sensor 26 be disposed as near as possible to each other within a possible range. This arrangement is made to increase the distinction of a read image and to reduce a loss of a quantity of light beams.

Figure 8:
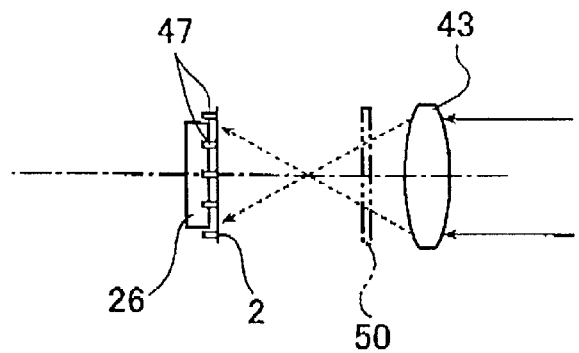
FIG. 8 is a view explaining a positional relationship between the film and the image sensor when a picture is taken with the camera according to the present invention in its intrinsic use.

In contrast, when the camera 40 according to this example is used for photographing which is its intrinsic use, it is preferable that the film (for photographing) 2 and the image sensor 26 be disposed with a certain degree of distance provided therebetween as shown in FIG. 8. This arrangement is made to prevent a component, which has passed through the film 2, of light beams having been incident from the outside, from being incident on the film 2 again by being reflected by the surface of the image sensor 26. Thus, when the camera 40 of this example is used for photographing which is its intrinsic use, it is preferable to insert a light absorbing member between the film 2 and the image sensor 26, if possible.

In order to make the distance between the film 2 and the image sensor 26 variable as described above, a film presser rib 47, for example, is disposed around the image sensor 26 disposed on the back lid 46 of the camera 40 as shown in FIG. 6. The film presser rib 47 is shown in detail in FIG. 8. The film presser rib 47 makes it possible to employ such a system that when the camera 40 according to this example is used for photographing as its intrinsic use, the distance between the film 2 and the image sensor 26 is increased by drawing the image sensor 26 to the back lid 46 side, whereas, when the camera 40 is used as an image reading device, the image sensor 26 is floated to the proximity of the surface of the film presser rib 47 as shown in FIG. 8.

According to the above example, it is possible to use one set of the camera 40 as a means for photographing and as an auxiliary means for displaying an image recorded on a developed film. As a result, it is possible for the camera 40 to display an image which can endure practical observation while arranging the camera 40 simply.

It is of course possible to previously provide the main body 42 of this example with an image display unit such as a LCD or the like so that an image can be output substantially only with the camera 40.

Figure 9:
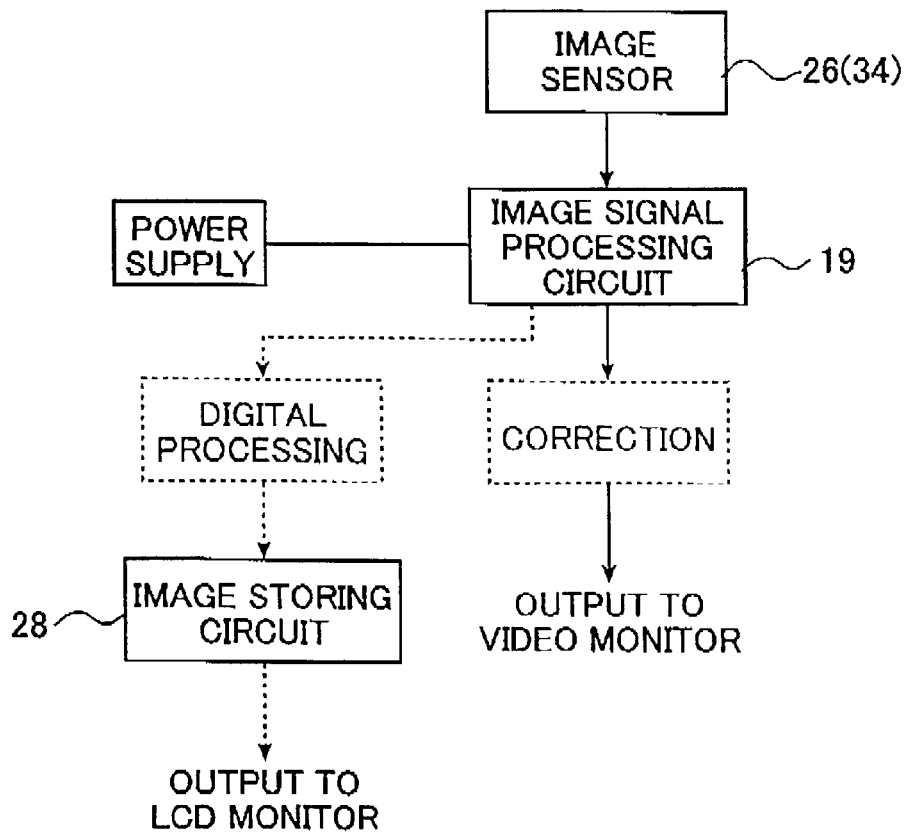
FIG. 9 is a view explaining an operation of an image signal processing circuit.

FIG. 9 is a view explaining output processing carried out by the above-mentioned image sensor 26.

As shown in FIG. 9, the output from the image sensor 26 is inputted to the image signal processing circuit 19, which subjects an image signal corresponding to an inputted negative image to predetermined gradation conversion, image density adjustment, white balance adjustment, and the like and thereafter displays the negative image on the video monitor 18 as a positive image.

Further, when an output destination is an LCD monitor or the monitor of a personal computer, The image signal processing circuit 19 stores the signal outputted from the image sensor 26 in the image recording circuit 28 after subjecting it to A/D (analog/digital) conversion. Then, the digitized signal is sequentially read from the image recording circuit 28 and displayed on the LCD monitor.

Figure 10:
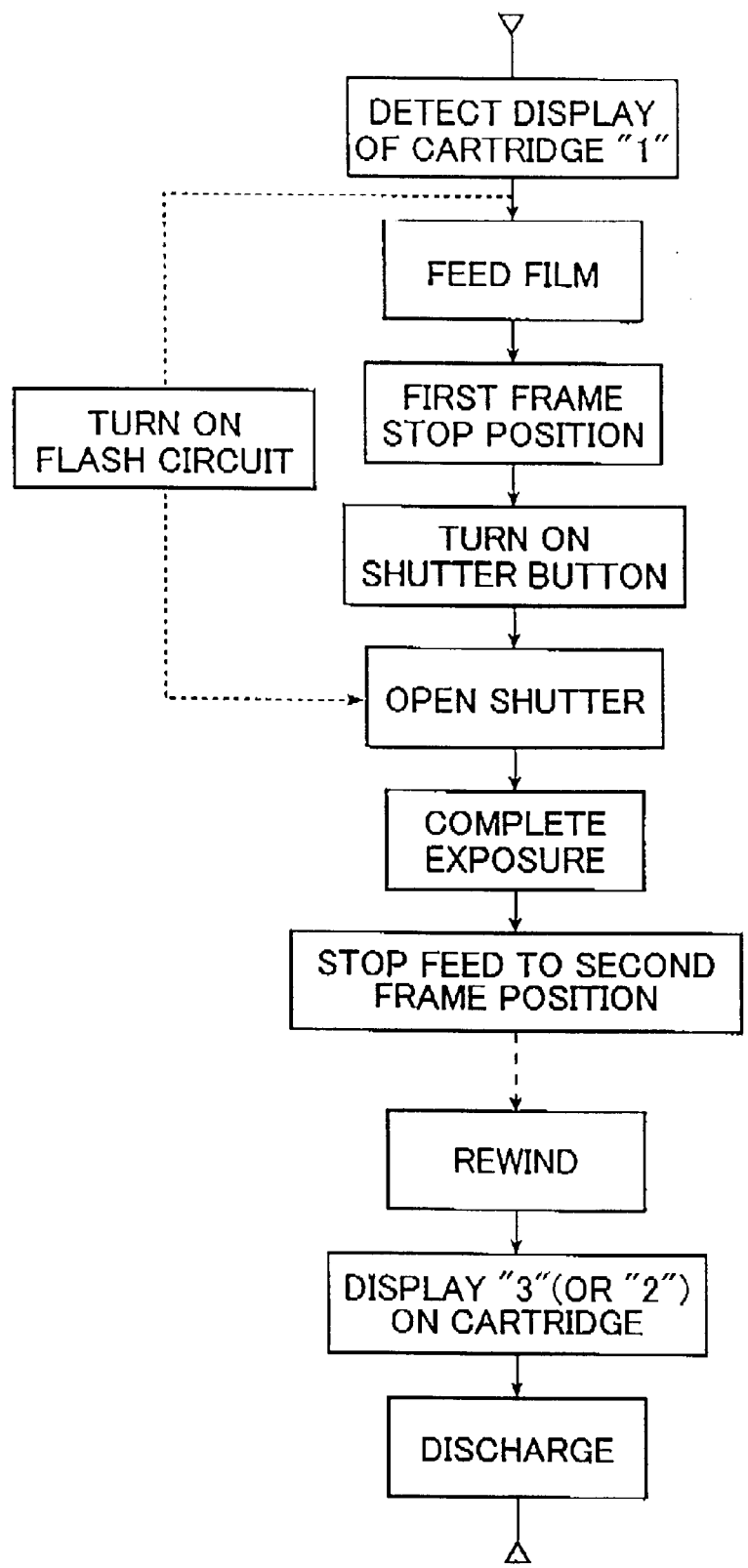
FIG. 10 is a flowchart (1) explaining an operation of the camera according to the present invention.
Figure 11:
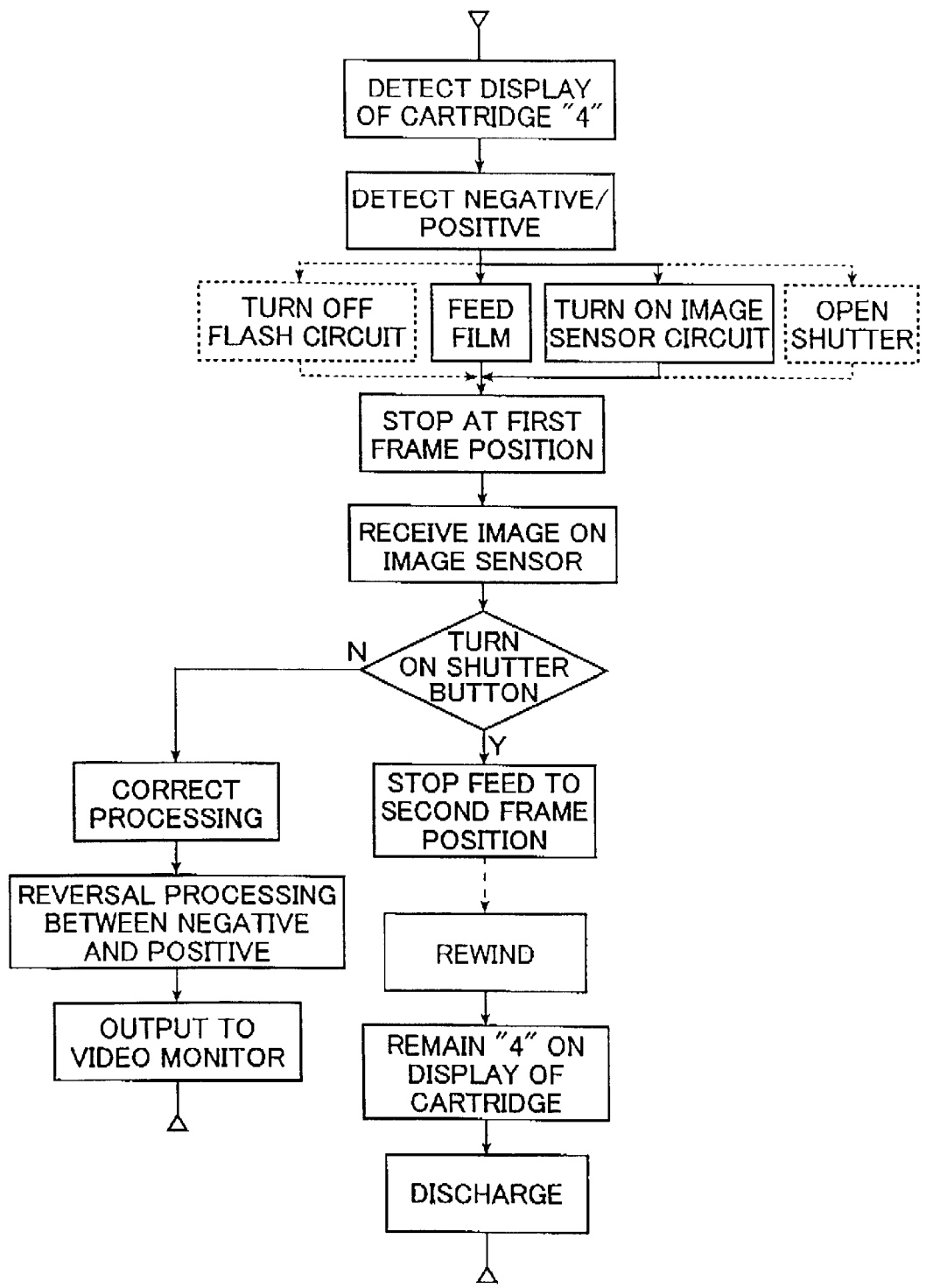
FIG. 11 is a flowchart (2) explaining an operation of the camera according to the present invention.

Further, FIGS. 10 and 11 are flowcharts showing operations of the camera 40 according to the above embodiment, wherein FIG. 10 shows a flowchart in a photographing mode, that is, an operation for recording an image on an unexposed film, and FIG. 11 shows a flowchart in a reading mode, that is, an operation for reading an image recorded on a developed film.

The operation shown in FIG. 10 is a photographing mode itself carried out by an ordinary camera (which uses the above-mentioned new standard film). That is, when it is detected that the above display on a loaded cartridge indicates "1" (not yet used), the film is fed and stopped at a first frame photographing position. When a shutter button is depressed, the film is exposed by opening a shutter and stopped at a second frame photographing position. Thereafter, when pictures are recorded on all the frames of the film by repeating the above operation, the film is wound into the cartridge, and the display on the cartridge is changed to "3".

Note that when the film is taken out by some reasons before pictures have been recorded on all the frames of the film, the above display on the cartridge of the film is changed to "2".

The film which has been subjected to the above processing can be taken out from the camera.

It should be noted that the film the cartridge of which displays "2" can be used by the camera again by loading it thereon.

In contrast, the operation shown in FIG. 11 is applied when the camera according to this example is used in the reading mode, that is, in a mode for reading an image recorded on a developed film. Note that it is assumed here that an output destination of the image is a video monitor.

When it is detected that the above display on the cartridge indicates "4" (the film has been developed), the camera determines whether the film is a negative film or a positive film and turns on a circuit necessary to read an image as well as turns off an unnecessary circuit.

Then, the camera stops the image recorded on a first frame at a predetermined reading position and reads the image being illuminated with a light source. The information of the thus read image is processed by the image signal processing circuit 19 as described above and displayed on the video monitor as a positive image.

Further, when the shutter button is depressed before or after the positive image is displayed (which is only an example), the film is transported and the image on the next frame is read.

When the image has been read, the film is wound into the cartridge and the processing is completed.

According to this example, there can be obtained an advantage that the overall size of the camera can be reduced because no lens system is necessary to read an image on a film and the distance between the film and the image reading unit can be considerably reduced. various types of image display devices can be used also in the this example as described above.

Note that the respective examples described above merely illustrate the present invention, and it is needless to say that the present invention is by no means limited thereto. For example, it is also possible to arrange the image signal processing circuit 19 as an external adaptor type circuit and to insert it between the camera and the monitor.

Further, it is preferable that the camera according to the present invention displays an image obtained by reversing a negative film as a standard image based on the film consumption in Japan and that a device for displaying an image from a positive film (so-called slide) be separately prepared as an external adaptor.

Furthermore, when the camera according to this example is used to read an image and an area CCD having sufficiently high sensitivity can be used, it is also possible that when the shutter (denoted by 50 in FIG. 8) is opened as described above, a diaphragm (not shown) is set to a small F number (at least F 8 and more preferably at least F 16) so as to directly use light beams incident from the outside as a spot light source. In this case, a practically usable degree of definition of a read image can be obtained while an amount of light is reduced.

Next, a camera according to a third embodiment of the present invention will be described.

The camera of the third embodiment of the present invention includes an image reading unit built therein similarly to the camera of the second embodiment of the present invention and can easily confirm the photographing contents of a developed film. Thus, the camera is arranged as a composite function type camera in which the image output function of the image output apparatus of the first embodiment of the present invention is assembled. However, the camera of the third embodiment is different from the camera of the second embodiment in that it has an imaging lens interposed between a developed film and an image sensor (image reading unit) such as an area CCD sensor or the like and that the light receiving surface of the image sensor does not depend on the size of an image area on a dveloped film, that is, the light receiving surface may be small in size. Specifically, in the camera of the third embodiment of the present invention, light emitted from a light source and passed through a developed film forms a focused image on the image sensor such as the area CCD sensor or the like through an imaging lens system, is received by the image sensor and photoelectrically converted thereby, and outputted to an image information output unit as image information.

Note that a camera 41 (41*a*) according to an example of the third embodiment of the present invention (refer to FIG.

12) is the same outside arrangement as the camera 40 according to the example of the second embodiment of the present invention shown in the outside perspective view of FIG. 5.

Figure 12:
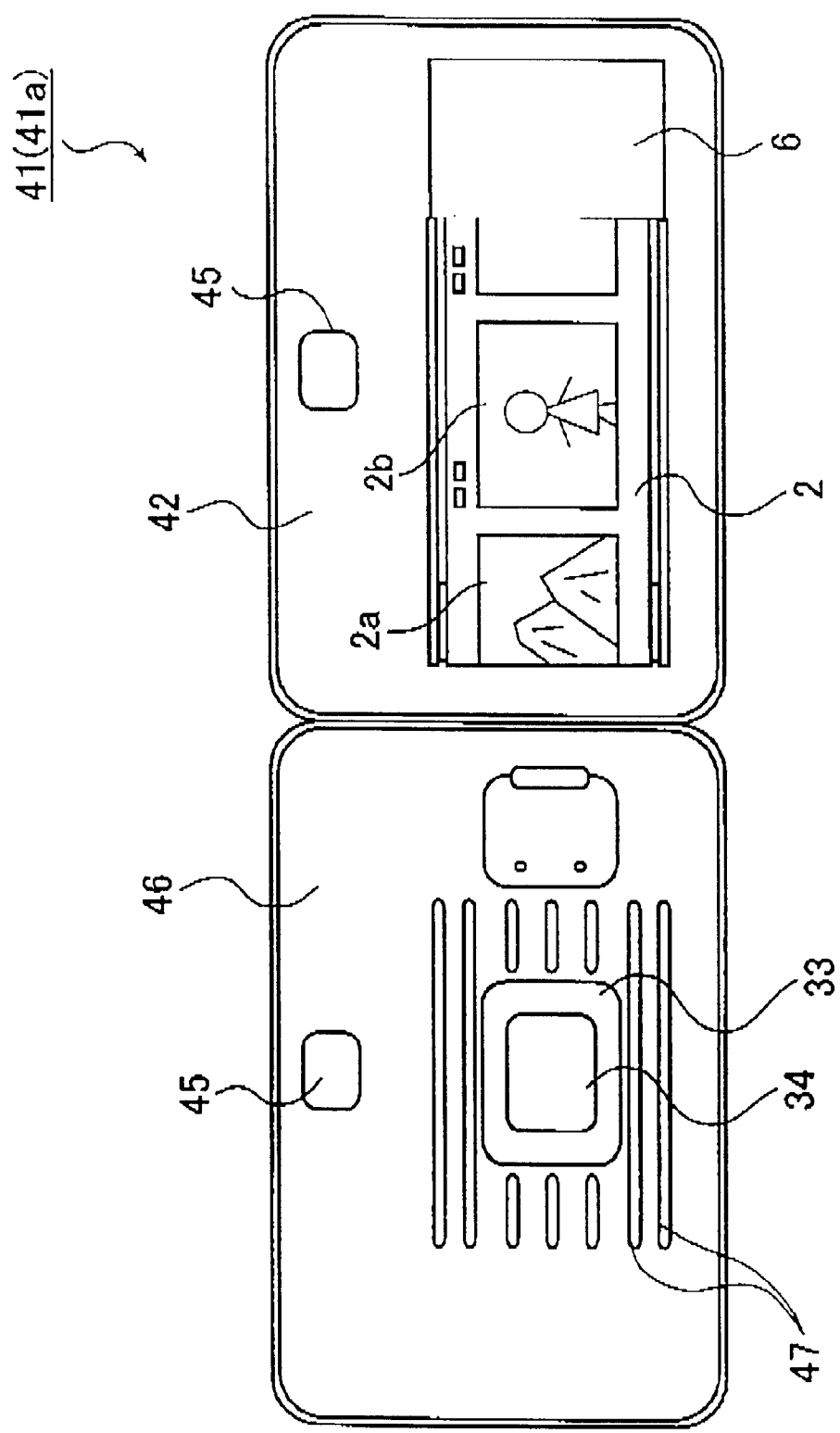
FIG. 12 is a view schematically showing another embodiment of the internal arrangement of the camera shown in FIG. 5 in the state in which the back lid of the camera is opened.

FIG. 12 schematically shows the internal structure of the camera 41 (41*a*) according to this example in a state in which the back lid 46 thereof is opened. Note that since the internal structure of the camera 41 (41*a*) shown in FIG. 12 is similar to that of the camera 40 shown in FIG. 6 except that the camera 41 (41*a*) includes an imaging lens 33 and an image sensor 34 the light receiving area of which is smaller than that of the image sensor (CCD area detector) 26, the same components of the camera 41 (41*a*) are denoted by the same reference numerals as used in the camera 40 and the detailed description thereof is omitted.

As shown in FIG. 12, the image sensor 34, which reads an image recorded on a developed film 2 through the imaging lens 33, is disposed in the back lid 46. The image sensor 34 reads the photographed images (2*a*, 2*b*, . . . ) of the developed film 2, which has been drawn out from a cartridge 6 loaded on the main body 42 of the camera 41 (41*a*) according to this example, through the imaging lens 33.

As will be described later, the image sensor 34 is disposed with the imaging lens 33 interposed between it and the film 2 and reads an image area on the film 2 fed thereunder through the imaging lens 33. Thus, an image sensor having a size smaller than that of the image area on the film can be used as the image sensor 34.

Figure 13:
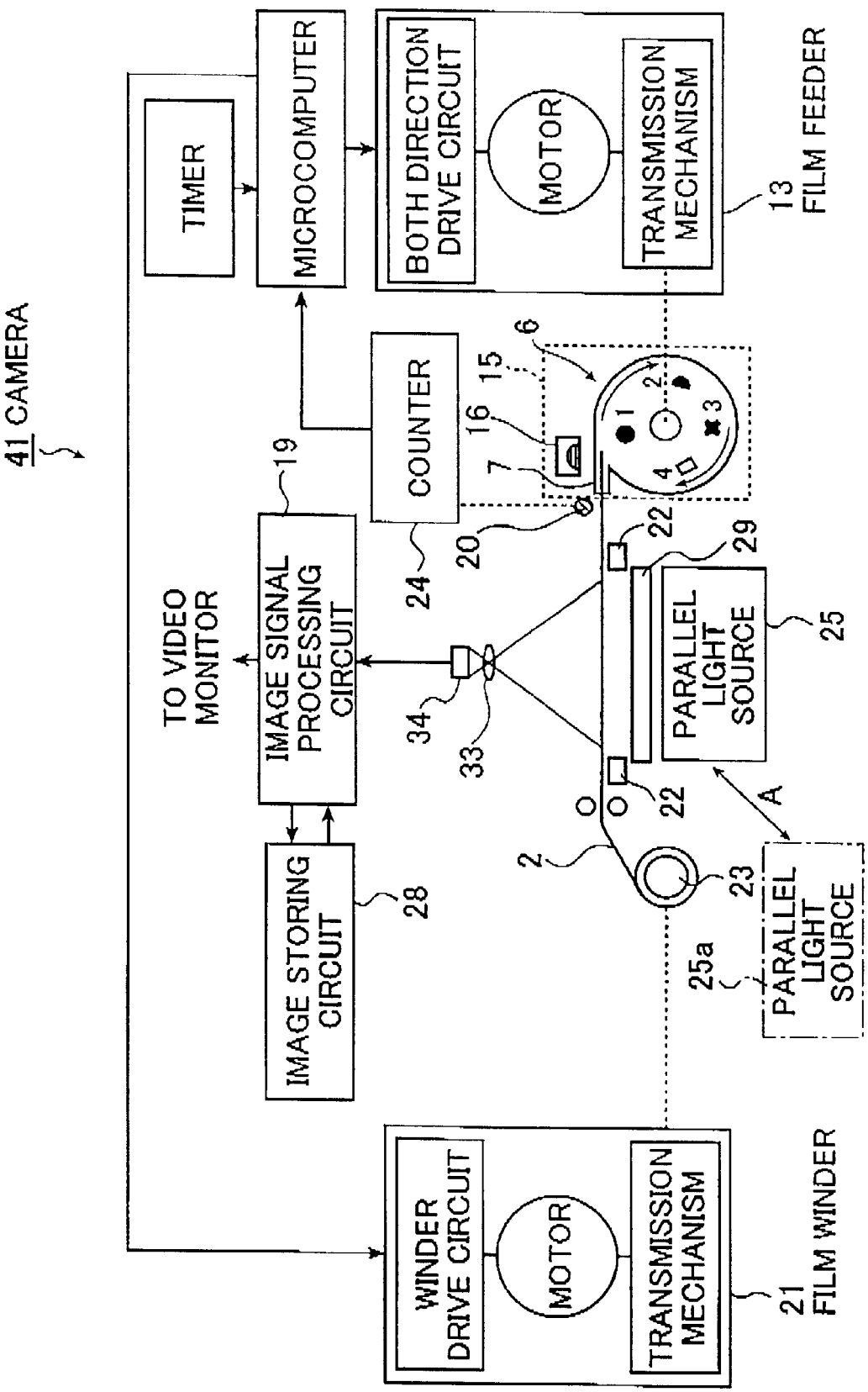
FIG. 13 is a block diagram schematically showing an embodiment of the internal arrangement of the camera shown in FIG. 12.

FIG. 13 shows the internal structure of a camera 41 according to a first example of the third embodiment of the present invention. Note that since the internal structure of the camera 41 shown in FIG. 13 is similar to that of the image output apparatus 1 shown in FIG. 2 except an operation button 27, a video monitor 18, the imaging lens 33 and the image sensor 34, the same components of the camera 41 are denoted by the same reference numerals as used in the image output apparatus 1, and the detailed description thereof is omitted.

Also in the camera 41 shown in FIG. 13, a parallel light source 25 for emitting parallel light beams may be composed of a combination of a multiplicity of light-emitting elements and collimator lenses as many as the light-emitting elements, a combination of a plane-shaped light source and a micro lattice or a micro porous plate, or the like as shown in FIG. 3A to 3D. However, the present invention is by no means limited thereto and an arrangement for introducing parallel light beams emitted from the outside may be employed. Note that the parallel light source 25 is arranged so as to retreat to a position 25*a* shown by a dot-dash-line as shown by an arrow A in FIG. 13.

Light beams emitted from the parallel light source 25 and passed through a low-pass filter 29 and an image region on the film 2 form a focused image on the surface of the image sensor 34 through the imaging lens 33. A reduction lens is used as the imaging lens 33 because the imaging lens 33 forms a focused image on the light receiving area of the image sensor 34, the size of which is smaller than the image area of the film 2. However, this example is by no means limited thereto and an actual-size lens and a magnifying lens may be used in some cases. However, it is needless to say that when the imaging lens 33 is the actual-size lens, the size of the light receiving area of the image sensor 34 must be approximately equal to or larger than that of the image area of the film 2, whereas when the imaging lens 33 is the magnifying lens, the size of the light receiving area of the image sensor 34 must be larger than that of the image area of the film 2.

Note that it is preferable that the imaging lens 33 is formed as thin as possible, and a wide angle lens can be preferably used as the imaging lens 33.

Further, reference numeral 23 denotes a spool on a side where the film 2 is wound, reference numeral 20 denotes a film presence sensor for optically sensing whether a film is present or absent, reference numeral 19 denotes an image signal processing circuit 19, and reference numeral 28 denotes an image recording circuit. The output from the image sensor 26 is connected to the image signal processing circuit 19 which processes the output as shown in FIG. 9 similarly to the second embodiment of the present invention. Then, the output from the image signal processing circuit 19 is connected, after it has been processed, to the external video monitor 18 through an output terminal 55 disposed on a side of the main body 42 of the camera 41 and displayed on the video monitor as an image.

Figure 14:
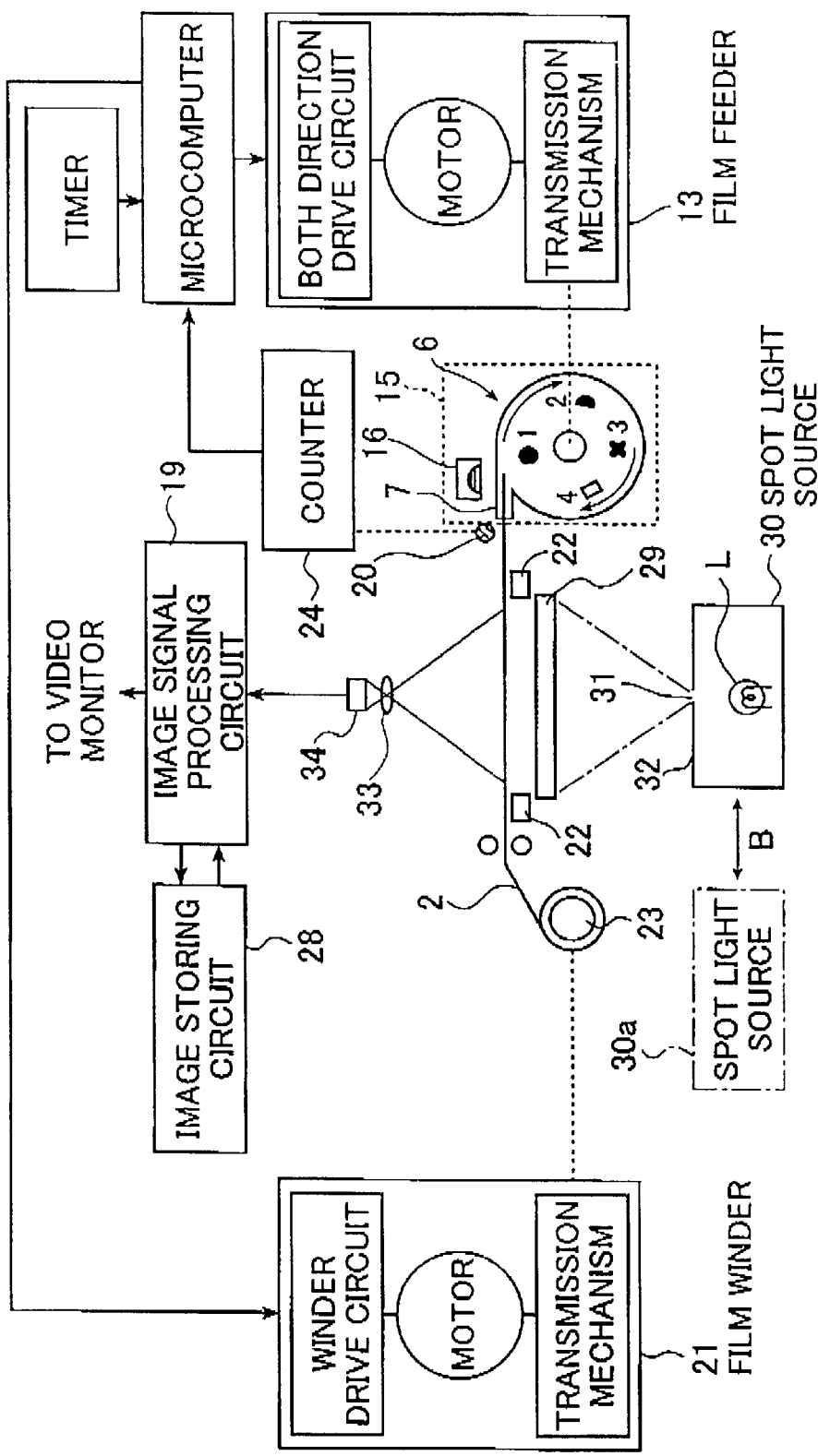
FIG. 14 is a block diagram schematically showing another embodiment of the internal arrangement of the camera shown in FIG. 12.

FIG. 14 shows the internal arrangement of a camera 41a according to a second example of the third embodiment. What makes the camera 41a according to the second example different from the camera 41 according to the first example shown in FIG. 13 is a light source. That is, the parallel light source 25 is used in the first example shown in FIG. 13, whereas a spot light source 30 is used in the second example shown in FIG. 14. The spot light source 30 is arranged such that a shading plate 32 having a pinhole 31 is disposed forward of a light source box containing a lamp L. Note that the spot light source 30 also retreats to a position 30a shown by a dot-dash-line as shown by an arrow B in FIG. 14.

Figure 15:
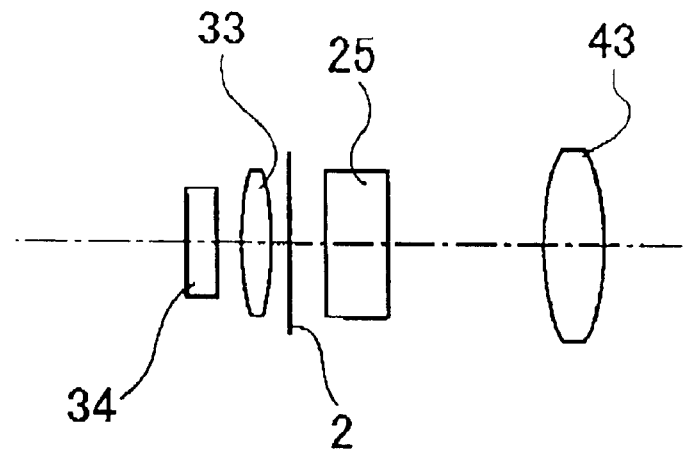
FIG. 15 is a view showing a positional relationship among a photographing lens, a film, an imaging lens, and an image sensor when the camera according to the present invention is used to read an image.

FIG. 15 is a view showing a positional relationship among the image sensor 34, the imaging lens 33, the film 2, the parallel light source 25, and the photographing lens 43 when an image recorded on the film 2 is read in the above example shown in FIG. 13. As is apparent also from FIG. 15, the photographing lens 43 is not used at all in this case, and it is preferable that the parallel light source 25, the film 2 and the image sensor 34 be disposed as near as possible to each other with the imaging lens 33 held between the image sensor 34 and the film 2.

Figure 16:
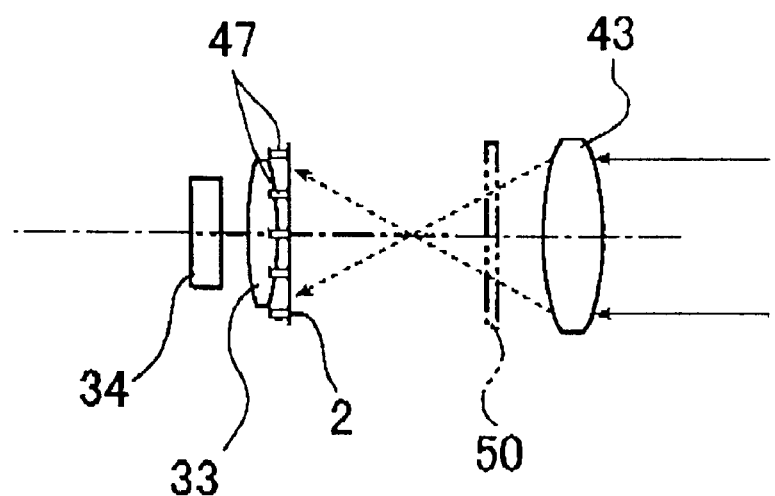
FIG. 16 is a view explaining a positional relationship between the film, the imaging lens, and the image sensor when a picture is taken with the camera according to the present invention in its intrinsic use.

In contrast, when the camera 40 (41a) according to the example is used for photographing which is its intrinsic use, it is preferable that the film (for photographing) 2 be separated from the imaging lens 33 and the image sensor 34 by a certain degree of distance as shown in FIG. 16. This arrangement is made to prevent a light component, which has passed through the film 2, of light beams incident from the outside from being reflected by the surface of the imaging lens 33 or the image sensor 34 and incident on the film 2 again. Thus, when the camera 41 (41a) according to the above example is used for photographing which is its intrinsic use, it is preferable to insert a light absorbing member between the film 2 and the imaging lens 33 or the image sensor 34.

In order to make the distance between the film 2 and the image sensor 34 variable as described above, a film presser rib 47 the details of which are shown in FIGS. 12 and 16, for example, is disposed around the imaging lens 33 and the image sensor 34 disposed on the back lid 46 of the camera 41 (41a) as shown in FIG. 12. The film presser rib 47 makes it possible to employ such a system that when the camera 41 (41a) according to the above example is used for photographing as its intrinsic use, the distance between the film 2 and the image sensor 34 is increased by drawing the imaging lens 33 and the image sensor 34 to the back lid 46 side (accommodating them in the back lid 46) as shown in FIG. 16, whereas, when the camera 40 (41a) is used as an image reading apparatus, the imaging lens 33 and the image sensor 34 are floated to the proximity of the surface of the film presser rib 47.

According to the respective examples of the third embodiment, it is possible to use one set of the camera as a photographing means and an auxiliary means for displaying images recorded on a developed film. As a result, it is possible for the camera to display an image which can endure practical observation while arranging the camera simply.

It is of course possible to previously provide the camera main body 42 according to these examples with an image display unit such as a LCD or the like so that an image can be output substantially only with the camera 40.

It should be noted that the image sensor 34, which is shown in FIGS. 12 to 16 and used in the third embodiment of the present invention, also can execute output processing as shown in FIG. 9 similarly to the image sensor 26 used in the above-mentioned first and second embodiments of the present invention (refer to FIGS. 2 to 4 and 6 to 8).

Further, the cameras 41 and 41a of the third embodiment of the present invention (refer to FIGS. 12 to 14) also can execute the photographing mode (photographing operation to an unexposed film) shown in FIG. 9 and the reading mode (reading of images of a developed film) shown in FIG. 10 similarly to the camera 40 of the second embodiment of the present invention (refer to FIG. 6).

According to the above example, there can be obtained an advantage that a composite function type camera, which has an image output function build therein, can read images effectively and has a high degree of a practical use, can be realized by the provision of the illuminating light source in the camera.

Various types of image display devices can be used also in the above example as described above.

An operation of the camera according to the first example of the third embodiment will be schematically described below.

When the developed film 2 is loaded on the camera 41, an optical mark reading unit 16 identifies a type of the loaded film and the above-mentioned state, and the image signal processing circuit 19 is switched in accordance with the type of the film based on the result of identification, similarly to the example of the first embodiment of the present invention.

Note that when a mark indicating that the film has been developed is not displayed on the cartridge or a mark other than the mark indicating that the film has been developed is displayed thereon in the identifying operation of the optical mark reading unit 16, the camera 41 displays a warning indicating it and is put into a waiting state.

The following description of the first example will be continued on the assumption that, as in the first embodiment, the film 2 is a negative film and images recorded on the film 2 are displayed on an image display device after they are read and reversed.

When a film cartridge is loaded as described above in a state in which the respective processing units of the camera 41 are put into operation and the parallel light source 25 is turned on, the negative film 2 drawn out from the loaded film cartridge is transported by a predetermined distance by a film feeder 13 and a film winder 21 and the image of a first frame is positioned at a reading position.

When the image frame on the negative film 2 is stopped at the predetermined position, the negative film 2 is held by being pressed in the direction of the imaging lens 33 and the image sensor 34 by an opening frame 22 as described above. Note that when the negative film 2 is the new standard film, it can be easily positioned by sensing a perforation that accurately corresponds to the position of the image frame.

The image frame of the negative film 2 positioned at the reading position is illuminated with parallel light beams emitted from the parallel light source 25, and light beams having passed therethrough, that is, light beams carrying the image information on the image frame are incident on the image sensor 34 through the imaging lens 33. The information, which has been subjected to photoelectric conversion in correspondence to the respective positions on the image frame, is read by the image sensor 34 in a predetermined order and sent to the image signal processing circuit 19.

The image signal processing circuit 19 subjects an image signal corresponding to a negative image inputted thereto to predetermined gradation conversion, image density adjustment, white balance adjustment, and the like and then displays the negative image on the video monitor 18 as a positive image. The opening frame 22 is put into an open state after a predetermined period of time passes (or in response to a command from an operator through an operation button of the camera 41), and subsequently the film feeder 13 resumes rotation. Then, the perforation of the next image frame is detected and the negative film 2 is stopped similarly to the previous case so that the next image frame is positioned at the reading position.

Note that it is preferable to continuously display the image of the previously displayed image frame during the moving period of time of the negative film 2. In this case, the data of the displayed image, which was created previously in the image signal processing circuit 19, can be stored in the image recording circuit 28 and used to display the image.

With this operation, a scene (image) can be smoothly changed without applying any visually unpleasant feeling to the operator of the camera 41 according to the first example.

The image sensor 34 used in the above example of the third embodiment will be described below.

As described above, the image sensor 34 may be composed of an area CCD having a light receiving area the size of which is smaller than the size of an image area on the negative film 2 (17 mm×30 mm in the above-mentioned APS film) in the image sensor 26 used in the above-mentioned first and second embodiments. That is, since the reduction lens can be used as the imaging lens 33 in the example of the third embodiment, the area CCD having the light receiving area the size of which is smaller than that of the image sensor 26 used in the above-mentioned first and second embodiments can be used as the image sensor 34. It should be noted that, when an actual-size lens or a reduction lens is used as the imaging lens 33 in the third embodiment, the image sensor 34 also can be composed of an area CCD the size of a light receiving area of which is approximately equal to or larger than the size of an image area on the negative film 2, that is, approximately equal to or larger than that of the image sensor 26.

It Note that it is sufficient to arrange the image sensor 34 similarly to the image sensor 26 except the size of the light receiving area thereof. Further, the image sensor 34 may have the number of pixels and sensitivity which are similar to those of the image sensor 26 while the pixel density of the image sensor 34 is naturally different from that of the image sensor 26, and a protective layer (glass layer) formed on the respective elements constituting the area COD used in the image sensor 34 may have a thickness and the like which are similar to those of the image sensor 26.

According to the above example, there can be obtained an advantage that a composite function type camera can be realized which can effectively read an image on a film, even if the image sensor having the small size is used, by assembling the light source therein and by using the imaging lens, and in which an image output function having a high degree of a practical use is assembled.

Note that while a case in which the video monitor is used as the image display device is exemplified in the above example, it is also possible to use other device such as a liquid crystal monitor and the like as the image display device.

Next, the second example of the third embodiment will be described.

The second example has a feature that it employs the spot light source 30 as the light source for illuminating the negative film 2, different from the first example described previously.

Specifically, the shading plate 32 having the pinhole 31 is interposed between the light source lamp L and the negative film 2 as in the camera 41a shown in FIG. 14, and an image on the negative film 2 is projected through the imaging lens 33 onto the image sensor 34 making use of light beams incident through the pinhole 31.

Note that light sources similar to the above-mentioned spot light source 30 shown in FIG. 4 can be used for the spot light source 30 shown in FIG. 14.

The camera according to the second example has an advantage that the light source can be simply arranged as compared with the camera of the first example described previously.

Further, when the camera according to the second example is used to read an image, it is also possible to directly use light beams incident from the outside through the opening of a shutter (denoted by reference numeral 50 in FIG. 16) as a spot light source as described above, when an area CCD having sufficiently high sensitivity can be utilized. In this case, a practically usable degree of definition of a read image can be obtained while an amount of light is reduced.

Note that the respective examples described above merely illustrate the present invention, and it is needless to say that the present invention is by no means limited thereto.

As described above in detail, according to the first and second embodiments of the present invention, it is possible to provide the image output apparatus that requires no lens system, reduces the distance from a film to the image reading unit such as the CCD and the like, has the light source built therein and can minimize the size of the apparatus to its limit as well as to provide the camera in which the function of the apparatus is assembled.

More specifically, since the parallel or spot light source is built in and combined with the two-dimensional image reading unit such as the area CCD, an image recorded on a film can be outputted in a form which can endure practical observation, which has a very great effect in a practical application.

As described above in detail, according to the third embodiment of the present invention, the employment of the built-in light source and the imaging lens makes it possible to provide the camera which can effectively read an image even if the image sensor having the small size is used and in which the image output function having the high degree of a practical use is assembled.

More specifically, the parallel or spot light source built in the camera makes it possible for the camera to output an image on a film in a form which can endure practical observation even if the imaging lens and the image sensor having the small size are used, which has a very great effect in the practical application.

What is claimed is:

1. An image output apparatus, comprising:
   a film transportation device for drawing out a developed film from a loaded cartridge containing the developed film, for stopping the developed film at a predetermined position, and thereafter for rewinding the developed film into the cartridge;
   a light source for illuminating an image recorded on the developed film;
   an image reading device disposed in a proximity of a transportation path of the developed film for reading information of the image recorded on the developed film through photoelectric conversion; and
   an image information output device for displaying the information of the image on an image display device,
   wherein said image reading device is a two-dimensional photoelectric conversion device having a size approximately equal to or larger than a size of an image area on the developed film, and light beams emitted from said light source pass through the developed film, are directly received by said image reading device, photoelectrically converted by said image reading device, and outputted to said image information output device as the information of the image.

2. The image output apparatus according to claim 1, wherein said light source is a parallel light source disposed on an opposite side of said image reading device with respect to the developed film.

3. The image output apparatus according to claim 1, wherein said light source is a spot light source disposed or an opposite side of said image reading device with respect to the developed film.

4. The image output apparatus according to claim 3, wherein said spot light source comprises a non-spot-shaped light source and a pinhole.

5. The image output apparatus according to claim 1, further comprising a low-pass filter interposed between said light source and said image reading device.

6. The image output apparatus according to claim 1, where in said image display device is any one of a home TV monitor, a CRT monitor, and a liquid crystal monitor.

7. A camera, comprising:
   a film transportation device for drawing out an unexposed film or a developed film from a loaded cartridge containing the unexposed film or the developed film, for stopping the unexposed film or the developed film at a predetermined position, and thereafter for rewinding the unexposed film or the developed film into the cartridge;
   an image exposing device for recording images on the unexposed film being drawn out or being rewound frame by frame;
   a light source for illuminating an image recorded on the developed film;
   an image reading device disposed in a proximity of a transportation path of the developed film for reading information of the image recorded on the developed film through photoelectric conversion; and
   an image information output device for displaying the information of the image on an image display device,
   wherein said image reading device is a two-dimensional photoelectric conversion device having a size approximately equal to or larger than a size of an image area on the developed film, and
   light beams emitted from said light source pass through the developed film, are directly received by said image reading device, photoelectrically converted by said image reading device, and outputted to said image information output device as the information of the image.

8. The camera according to claim 7, wherein said light source is a parallel light source disposed on an opposite side of said image reading device with respect to the developed film.

9. The camera according to claim 7, wherein said light source is a spot light source disposed on an opposite side of said image reading device with respect to the developed film.

10. The camera according to claim 9, wherein said spot light source comprises a non-spot-shaped light source and a pinhole.

11. The camera according to claim 9, wherein said spot light source introduces light beams from an outside of the camera through a minute light transmission device.

12. The camera according to claim 7, further comprising a low-pass filter interposed between said light source and said image reading device.

13. The camera according to claim 7, wherein said image display device is any one of a home TV monitor, a CRT monitor, and a liquid crystal monitor.

14. A camera, comprising:
   a film transportation device for drawing out an unexposed film or a developed film from a loaded cartridge containing the unexposed film or the developed film, for stopping the unexposed film or the developed film at a predetermined position, and thereafter for rewinding the unexposed film or the developed film into the cartridge;
   an image exposing device for recording images on the unexposed film being drawn out or being rewound frame by frame;
   a light source for illuminating an image recorded on the developed film;
   an image reading device disposed in a proximity of a transportation path of the developed film for reading information of the image recorded on the developed film through photoelectric conversion; and
   an image information output device for displaying the information of the image on an image display device,
   wherein said image reading device is a two-dimensional photoelectric conversion device, and light beams emitted from said light source pass through the developed film and an imaging lens system, are received by said image reading device, photoelectrically converted by said image reading device, and outputted to said image information output device as the information of the image.

15. The camera according to claim 14, wherein said light source is a parallel light source disposed on an opposite side of said image reading device with respect to the developed film.

16. The camera according to claim 14, wherein said light source is a spot light source disposed on an opposite side of said image reading device with respect to the developed film.

17. The camera according to claim 16, wherein said spot light source comprises a non-spot-shaped light source and a pinhole.

18. The camera according to claim 16, wherein said spot light source introduces light beams from an outside of the camera through a minute light transmission device.

19. The camera according to claim 14, further comprising a low-pass filter interposed between said light source and said image reading device.

20. The camera according to claim 14, wherein said image display device is any one of a home TV monitor, a CRT monitor, and a liquid crystal monitor.

* * * * *